United States Patent Office 3,352,700
Patented Nov. 14, 1967

3,352,700
WASTE SULPHITE LIQUOR ADHESIVE
COMPOSITION
John Biskup, Chatham, Norman R. Migdol, Carteret, and Edward C. Scholl, Ramsey, N.J., assignors to Congoleum-Nairn Inc., Kearny, N.J., a corporation of New York
No Drawing. Filed Nov. 1, 1963, Ser. No. 320,832
8 Claims. (Cl. 106—123)

This invention relates to an adhesive composition and particularly to such compositions containing waste sulfite liquors.

In the manufacture of wood pulp for paper making, the lignin is separated from the cellulose. Wood and similar lignified materials are heated with a solution of sulfurous acid and acid sulfites which causes the lignin to go into solution leaving the cellulose and cellulosans. This procedure is commonly known as the sulfite process. Essentially the process involves the digestion of wood, usually in the form of chips, at temperatures of 130° to 150° C. in an aqueous solution containing alkaline-earth bisulfites and an excess of sulfur dioxide. During digestion, lignin combines with sulfur dioxide or the sulfurious acid and is rendered soluble, or peptized in solution. The less resistant hemicelluloses are hydrolized to simpler compounds and a portion of the wood cellulose in degraded. Extraneous components of the wood also react to a greater or lesser extent with the cooking liquor. The object of the sulfite is to produce the maximum yield of pure cellulose. The fundamental reaction of sulfite pulping is sulfonation of lignin and the lignin derivative in the waste liquor is in the form of calcium and magnesium salts of lignosolfonic acid. The exact composition of waste sulfite liquor is not known. It is commonly sold as a by-product in concentration of about 50 to 60%.

Waste sulfite liquor has been used for many years in adhesive compositions. The liquor forms a "mud cracked" film on drying. It has been the practice, therefore, to add various components to the composition which improve the cohesiveness of the film thereby minimizing the mud cracking. Various fillers have been utilized for this purpose. Clay has found particular widespread use since it is inexpensive and gives the adhesive composition additional desirable properties. Small amounts of various inorganic and organic composition have also been used which are non-volatile liquids at normal temperature. Types of such compositions are glycerine and phosphoric acid. The adhesive utilized widely for securing linoleum and tile to floor surfaces have a base of waste sulfite liquor. This adhesive is generally sold under the designation of "linoleum paste." This type of adhesive has a dark brown to black color which has severely limited its use for present day flooring materials. Widespread use is presently being made of translucent flooring material which prohibit the use of dark color adhesive since the adhesive is visible through the tile. The addition of pigments, such as titanium dioxide, make dark adhesive acceptable for such use but it has been found that at least 15% of titanium dioxide is necessary based on the total adhesive weight. Such large amounts of expensive pigment substantially increases the cost of the adhesive composition.

It is an object of the invention to provide an adhesive composition of waste sulfite liquor which has a substantially lighter color. Another object of the invention is to provide such a composition which is inexpensive. A further object of the invention is to provide such an adhesive composition which can be produced in a simple and economical manner. Other objects and the advantages of the invention will appear from the following detailed description.

In accordance with the invention, it has been discovered that the addition of a mono or dibasic salt of phosphoric acid to an adhesive composition containing waste sulfite liquor will substantially eliminate the dark color of the composition. The amount of salt required is very small varying from 0.3% to about 2.0% of the weight of the total composition. Markedly increased lightening can be obtained with as little as 0.1% of the salt. Amounts above 1.0% can be utilized up to about 10% but the higher concentration with certain phosphate salts, cause thickening of the composition. The ability of the mono and dibasic phosphate salts to react in this manner is surprising since the tri-basic salt has no effect on the color. Additionally, the pH of the composition is not a controlling factor since other acids, as for example sulfuric acid, do not improve the color of the composition. In addition, oxidizing and reducing agents, such as hydrogen peroxide and potassium permanganate, darken the color of the waste sulfite liquor.

The mono or dibasic salt of phosphoric acid can be any salt which is at least partially soluble in the concentration required in the waste sulfite liquor. The alkali metal, i.e., lithium, sodium, potassium, rubidium, or cesium, and ammonium salts are preferred but any of the other mono or dibasic phosphate salts can be used such as the alkaline earth metal salts, calcium, barium, magnesium, beryllium, strontium, and the like.

Various other components can be added to the adhesive composition of the invention. Fungicides are commonly added to prevent fermentation of the composition. Fillers are usually added to increase the viscosity of the composition and also plasticize the resulting film. A wide variety of finely divided filler material is available in commercial quantities. They are materials of mineral origin which are comminuted to small particles. Clay, diatomaceous earth, precipitated calcium silicate, and asbestos are the most commonly used. Pigments can also be added to the composition with titanium dioxide being the most common. The amount of filler is usually within the range of about 10 percent to about 60 percent based on the weight of the composition with a range of 25 to 45 percent being preferred.

The adhesive composition of this invention can also be blended with other adhesive materials such as starch, dextrin, polyvinyl alcohol, hydroxide ethyl cellulose, methyl cellulose or carboxy-methyl-cellulose, rosin derivatives, terpenes, and any other water-soluble or water dispersible resin to obtain various qualities.

The adhesive of this invention have excellent tack and adhesive bond and good open time.

The following examples are given for purposes of illustration.

EXAMPLE 1

An adhesive having the following composition was prepared:

| | Parts |
|---|---|
| Waste sulfite liquor | 60 |
| Clay | 40 |
| Monoammonium phosphate | .30 |
| Fungicide | .03 |
| Titanium dioxide | 4 |

The components were mixed together to form a composition having a solids content of 70.2% and a weight of 11.97 pounds per gallon of composition. The adhesive bond strength after 3 days in a standard temperature and humidity room (73° F.∓2.0°, 50%±4 humidity) was 30.5 pounds and after seven days 30.0 pounds.

A test was conducted to demonstrate the excellent strength of the bond of the adhesive of Example 1 after exposure of the adhesive to air over a period of time and the amount of adhesive which transfers onto the back of a 9 by 9 inch vinyl composition tile. The tile was embedded into the adhesive film after it had been allowed to dry for the length of time indicated in Table 1. The amount of adhesive transferred on the back of the tile and the quality of the bond was noted after 24 hour conditioning.

TABLE 1

| Open Time (minutes) | Bond | Transfer (percent) |
|---|---|---|
| 5 | Very good | 100 |
| 10 | do | 80 |
| 15 | Good | 50 |
| 20 | Fair | 10 |
| 25 | Fair-poor | 2 |
| 30 | Poor | 1 |
| 35 | do | 0 |

The excellent tack of the adhesive was tested by the spherical probe method (Adhesive Age, September 1963, page 30) and the results are tabulated in Table II.

TABLE II

Minutes: Tack (pounds $\times 10^{-2}$ per contact area of probe)
10 _____ 18
20 _____ 17
30 _____ 30
40 _____ 30
50 _____ 30
60 _____ 28
70 _____ 21

The color of the adhesive produced in Example 1 was compared with the identical adhesive replacing the monoammonium phosphate with various compositions which are shown in Table III.

TABLE III

| Percent | NH$_4$H$_2$PO$_4$ | | | | (NH$_4$)$_3$PO$_4$ | | H$_3$PO$_4$ | |
|---|---|---|---|---|---|---|---|---|
|  | 0 | 0.1 | 0.3 | 5.0 | 0.1 | 5.0 | 0.3 | 3 |
| Color | Brown to Black | Tan | Light Tan | Light Tan | Brown to Black | Brown to Black | Brown to Black | Light Tan |

As indicated in Table III it requires over ten times as much phosphoric acid to obtain the same color.

EXAMPLE 2

The following adhesive composition has excellent tack and bonding properties.

Parts
Waste sulfite liquor _____ 52
Clay _____ 36
Diammonium phosphate _____ 1.0
Fungicide _____ .3
Titanium dioxide _____ 3.6

EXAMPLE 3

The following adhesive composition has excellent tack and bonding properties and has the further advantage of retaining the color in both the wet and dry film.

Parts
Waste sulfite liquor _____ 50
Clay _____ 35
Mono-basic sodium phosphate _____ 2
Fungicide _____ .3
Titanium dioxide _____ 3.5

Any departure from the foregoing description which conforms to the invention is intended to be included within the scope of the claims.

What is claimed is:
1. An adhesive having a light coloration, excellent initial tack and good bonding strength consisting essentially of a uniform mixture of about 52 to 75.7 percent of waste sulfite liquor, about 25 to 45 percent of mineral filler and about 0.3 to 3 percent of a salt selected from the group consisting of mono-basic and dibasic phosphate salts of lithium, sodium, potassium, rubidium, cesium, ammonium, calcium, barium, magnesium, beryllium and strontium.
2. An adhesive having a light coloration, excellent initial tack and good bonding strength, consisting of a uniform mixture of about 30 to 89.9 percent of waste sulfite liquor, about 10 to about 60 percent of mineral filler and about 0.1 to about 10 percent of a salt selected from the group consisting of mono-basic and dibasic phosphate salts of lithium, sodium, potassium, rubidium, cesium, ammonium, calcium, barium, magnesium, beryllium and strontium.
3. The composition of claim 2 wherein said filler is finely divided clay.
4. The adhesive composition of claim 2 wherein said salt is monoammonium phosphate salt.
5. The composition of claim 4 wherein said filler is finely divided clay.
6. The adhesive composition of claim 2 wherein said salt is diammonium phosphate salt.
7. The adhesive composition of claim 2 wherein said salt is mono-basic sodium phosphate salts.
8. The composition of claim 7 wherein said filler is finely divided clay.

References Cited
UNITED STATES PATENTS

| 1,467,321 | 9/1923 | Hurt | 106—123 |
| 1,848,981 | 3/1932 | Wallace | 106—123 |
| 1,860,043 | 5/1932 | Ludwigsen | 106—123 |
| 2,319,883 | 5/1943 | Ritchie | 106—123 |
| 2,457,357 | 12/1948 | Fenn | 106—123 |
| 2,579,482 | 12/1951 | Fenn | 106—123 |
| 2,822,358 | 2/1958 | Hearon et al. | 106—123 |
| 3,041,187 | 6/1962 | Jordan et al. | 106—15 |

ALEXANDER H. BRODMERKEL, Primary Examiner.

D. J. ARNOLD, Examiner.